(12) United States Patent
Galinda-Legaria et al.

(10) Patent No.: US 7,590,646 B2
(45) Date of Patent: Sep. 15, 2009

(54) SYSTEM AND METHOD FOR SEGMENTED EVALUATION OF DATABASE QUERIES

(75) Inventors: Cesar A. Galinda-Legaria, Redmond, WA (US); Goetz Graefe, Bellevue, WA (US); Milind M. Joshi, Bellevue, WA (US); Ross T. Bunker, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 602 days.

(21) Appl. No.: 10/829,595

(22) Filed: Apr. 22, 2004

(65) Prior Publication Data

US 2004/0205078 A1 Oct. 14, 2004

Related U.S. Application Data

(63) Continuation of application No. 09/800,379, filed on Mar. 6, 2001, now Pat. No. 6,748,392.

(51) Int. Cl.
*G06F 17/30* (2006.01)
(52) U.S. Cl. .......................................... 707/102; 707/3
(58) Field of Classification Search ............... 707/1–10, 707/100–104.1, 200–206
See application file for complete search history.

(56) References Cited

U.S. PATENT DOCUMENTS

| | | | |
|---|---|---|---|
| 5,701,454 A * | 12/1997 | Bhargava et al. | 707/2 |
| 5,855,012 A | 12/1998 | Bhargava et al. | 707/2 |
| 6,108,658 A * | 8/2000 | Lindsay et al. | 707/101 |
| 6,263,339 B1 | 7/2001 | Hirsch | |
| 6,275,918 B1 | 8/2001 | Burky et al. | 711/213 |
| 6,298,338 B1 * | 10/2001 | Melton et al. | 707/2 |
| 6,317,738 B1 * | 11/2001 | Lohman et al. | 707/3 |
| 6,370,541 B1 * | 4/2002 | Chou et al. | 707/103 X |
| 6,411,951 B1 | 6/2002 | Galindo-Legaria et al. | 707/3 |
| 6,418,400 B1 | 7/2002 | Webber | |
| 6,510,422 B1 | 1/2003 | Galindo-Legaria et al. | |
| 6,618,719 B1 | 9/2003 | Andrei | 707/2 |
| 6,651,055 B1 | 11/2003 | Kilmer et al. | |

(Continued)

OTHER PUBLICATIONS

Chatziantoniou, D. et al, "Groupwise Processing of Relational Queries", *Proceedings of the 23rd VLDB Conference*, 1997, 476-485.

(Continued)

*Primary Examiner*—Diane Mizrahi
(74) *Attorney, Agent, or Firm*—Woodcock Washburn LLP

(57) ABSTRACT

A method of satisfying a database query includes evaluating certain joins on a per-segment basis. An expression tree is produced for the query, and the expression tree is evaluated to identify joins whose operands are two instances of the same relation and whose join predicate conjunctively includes an equality comparison between two instances of the same column. When such a join is identified, it may be evaluated by segmenting the operand relation according to the columns that are compared for equality in the predicate. The join is then evaluated by performing the join operation separately on each segment. Segments may be spooled separately, thereby exploiting the efficiencies obtained by spooling even where the entire relation is too large to fit in the spool. Execution iterators are provided for spooling successive segments and for applying the join to the spooled segment.

45 Claims, 9 Drawing Sheets

U.S. PATENT DOCUMENTS

| | | | |
|---|---|---|---|
| 6,847,962 B1* | 1/2005 | Cochrane et al. | 707/4 |
| 6,985,901 B1* | 1/2006 | Sachse et al. | 707/10 |
| 7,082,430 B1* | 7/2006 | Danielsen et al. | 707/10 |
| 2002/0184260 A1 | 12/2002 | Martin et al. | |
| 2004/0237029 A1 | 11/2004 | Medicke et al. | |
| 2005/0097100 A1* | 5/2005 | Galindo-Legaria et al. | 707/3 |

OTHER PUBLICATIONS

Roy, Prasan, et al., "Efficient and Extensible Algorithms for Multi Query Optimization", *Technical Report, Indian Institute of Technology*, Bombay, 1998, 249-260.

Zhang, W., et al. "Speeding Up Heterogeneous Data Access by Converting Pushing Down String Comparisons", *15th International Conference on Data Engineering*, 1999, 261.

Claussen, J. et al., "Optimization and Evaluation of Disjunctive", *Knowledge and Data Engineering, IEEE Transactions on Passau Univ., Germany*, Mar./Apr. 2000, 238-260.

Galindo-Legaria, C., "Outerjoin Simplification and Re-Ordering for Query Optimization", ACM Transactions on Database Systems, Mar. 1997, 22(1), 43-74.

* cited by examiner

Customers — 208

| cust_name | branch | balance | ... |
|---|---|---|---|
| James | Key West | $1000 | ... |
| William | Oyster Bay | $2000 | ... |
| Paul | Liverpool | $10,000 | ... |
| Cleo | Boston | $5,000 | ... |
| . | . | . | . |

*FIG. 2*

Employees 200a

| emp_name | dep't | salary |
|---|---|---|
| Mike | DMBS | 1000 |
| Janice | Legal | 5000 |
| Laura | DBMS | 2000 |

×

Departments 200b

| dep't | building |
|---|---|
| DBMS | 50 |
| Legal | 114 |

200c =

| | Employees.<br>emp_name | Employees.<br>dep't | Employees.<br>salary | Departments.<br>dep't | Departments.<br>building |
|---|---|---|---|---|---|
| 1 | Mike | DMBS | 1000 | DBMS | 50 |
| 2 | Mike | DMBS | 1000 | Legal | 114 |
| 3 | Janice | Legal | 5000 | DBMS | 50 |
| 4 | Janice | Legal | 5000 | Legal | 114 |
| 5 | Laura | DBMS | 2000 | DBMS | 50 |
| 6 | Laura | DBMS | 2000 | Legal | 114 |

*FIG. 3*

| | Employees.<br>emp_name | Employees.<br>dep't | Employees.<br>salary | Departments.<br>dep't | Departments.<br>building |
|---|---|---|---|---|---|
| 1 | Mike | DMBS | 1000 | DBMS | 50 |
| 4 | Janice | Legal | 5000 | Legal | 114 |
| 5 | Laura | DBMS | 2000 | DBMS | 50 | ium # SYSTEM AND METHOD FOR SEGMENTED EVALUATION OF DATABASE QUERIES

CROSS-REFERENCE TO RELATED CASES

This application is a continuation of U.S. patent application Ser. No. 09/800,379 (now U.S. Pat. No. 6,748,392), entitled "System and Method for Segmented Evaluation of Database Queries," filed Mar. 6, 2001.

FIELD OF THE INVENTION

The present invention relates generally to the field of database systems. More particularly, the invention relates to a system and method for evaluating certain types of database queries on a per-segment basis, and for identifying those queries that are candidates for per-segment evaluation.

BACKGROUND OF THE INVENTION

Database systems store, retrieve, and process information. In order to retrieve information from the database, a user provides a query (written in a query language such as SQL), where the query specifies the information to be retrieved and the manner in which it is to be manipulated or evaluated in order to provide a useful result. To process the query, the database system may convert the query into a relational expression that describes algebraically the result specified by the query. The relational expression is then used to produce an execution plan, which describes particular steps to be taken by a computer in order to produce the sought result.

When a relational expression is produced from a query, it may be the case that certain terms in the expression are redundant. For example, the operands of a join operator may be two instances of the same table, T. If T is a table that is stored in the database, then a straightforward evaluation of the join requires redundant accesses to the same (possibly large) table T during execution. Worse yet, T may not be a stored table, but rather may a table that is computed from a complex relational sub-expression. In this case, straightforward evaluation of the expression may require T to be derived twice from the same (possibly complicated) expression at runtime.

A conventional way to address this problem is to identify and evaluate common sub-expressions, spool (i.e., "buffer") the entirety of the sub-expression result, and use the spooled result whenever the common sub-expressions are used. However, the sub-expression result may be relatively large, in which case some of the benefits of spooling will be lost. If a sub-expression result is larger than the available memory, then spooling the result may cause it to be paged to disk, which may be just as costly of resources as computing the result of the sub-expression twice.

In view of the foregoing, there is a need for a query evaluation system that overcomes the drawbacks of the prior art.

SUMMARY OF THE INVENTION

The present invention provides a system and method for efficient query evaluation. A technique is provided for identifying joins in relational expressions that can be performed on a per-segment basis. In accordance with the invention, joins are identified whose operands are different instances of a common sub-expression, optionally modified by an aggregate or a filter. Each segment of the common subexpression is spooled, and the join is performed successively on each of the segments. Because the segments are likely to be relatively small compared to the entire sub-expression, these segments may fit in memory in situations where the entire sub-expression result does not. Thus, unnecessary spooling of an entire sub-expression result (and the consequent memory swapping) is avoided.

Joins that may be evaluated on a per-segment basis are identified by searching for joins that meet the following criteria: First, the two operands of the join must be different instances of the same relation. Optionally, each instance of the relation may be modified by an aggregate and/or a filter. Second, the join predicate must be, or conjunctively include, an equality comparison between the same column in different instances of the relation. If the join predicate contains such a comparison, then rows of the first instance of the relation will never join with rows of the second instance of the relation that have different values in the equality-compared columns. Thus, the relation can be "segmented" into groups of rows having common values in the columns that are compared for equality in the join predicate, and the join may be separately applied to each of the groups.

The invention provides a relational operator called "GbApply," which specifies per-segment evaluation of a relational expression. GbApply takes a relation as its input, segments the relation according to a set of columns, and applies a relational fragment to successive segments of the relation. A join meeting the conditions described above may be rewritten using a GbApply operator. The relation that is common to both sides of the join is used as the input to the GbApply operator, and the columns that are compared for equality in the join predicate are specified as the segmenting columns. The join expression is then rewritten so that the operands and the predicate refer to instances of the segment rather than instances of the entire relation; the rewritten join expression is the "relational fragment" used by the GbApply operator. The GbApply operator may be used as part of the expression tree that represents a relational expression. Expressions trees including the GbApply operator may be "reordered" if certain conditions are met; reordering the order of evaluating an expression may result in a more efficient evaluation of the expression.

Execution iterators are provided which may be used to perform a GbApply operation. The "SegSpool" iterator receives a sorted relation as input and spools a segment of the relation. Preferably, SegSpool performs the segmentation by spooling successive rows of the sorted relation until a row is encountered whose values in the segmenting columns differ from the last row. The "SegApply" iterator applies the relational fragment associated with a GbApply operator to the spool created by SegSpool. Application of the relational fragment to the spool is repeated until the relational fragment is unable to produce additional result rows based on the spooled segment. SegApply then calls SegSpool to spool the next segment.

According to a feature of the invention, SegSpool and SegApply may be used to perform a major-minor sort, or to compute the aggregates "min" and "max." When a major-minor sort is performed, SegSpool is used to segment the table according to the "major" columns; SegApply then applies a sorting operation (on the "minor" columns) to each of the segments. In order to compute the aggregates "min" and "max" (e.g., the minimum value in column A for each group of rows grouped by column B), the table is sorted on columns B and A. SegSpool is then used to segment the table according to column B, and SegApply is used to identify the first row in each segment (for a "max" calculation, the sort on column A is performed in descending order, so that the first row in each group will have the highest column A value for that group).

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 2 is a block diagram of an exemplary database table;

FIG. 3 is a block diagram showing an exemplary binary operation on two tables;

DETAILED DESCRIPTION OF THE INVENTION

Overview

A database system is one of the most commonly-used software tools. Database systems are used to maintain and access all types of information, such as financial records, personnel records, and inventory records. Database systems typically perform operations on information in the form of tables or "relations." One operation that can be performed on tables is the "join," which takes two tables as operands and creates a third table that is based on the two operands and on a predicate. A straightforward way of computing a join involves storing each operand table in memory and combining the two tables row by row. This technique uses large amounts of memory to store the operands. Often, the operand tables are so large that they must be paged to disk, thereby increasing the amount of time required to evaluate the join. By exploiting properties of the operands and the join predicate, a join can be computed without storing the entire operand table in memory at once, thereby decreasing the time and resources necessary to evaluate a join.

Exemplary Computing Environment

Figure 1:
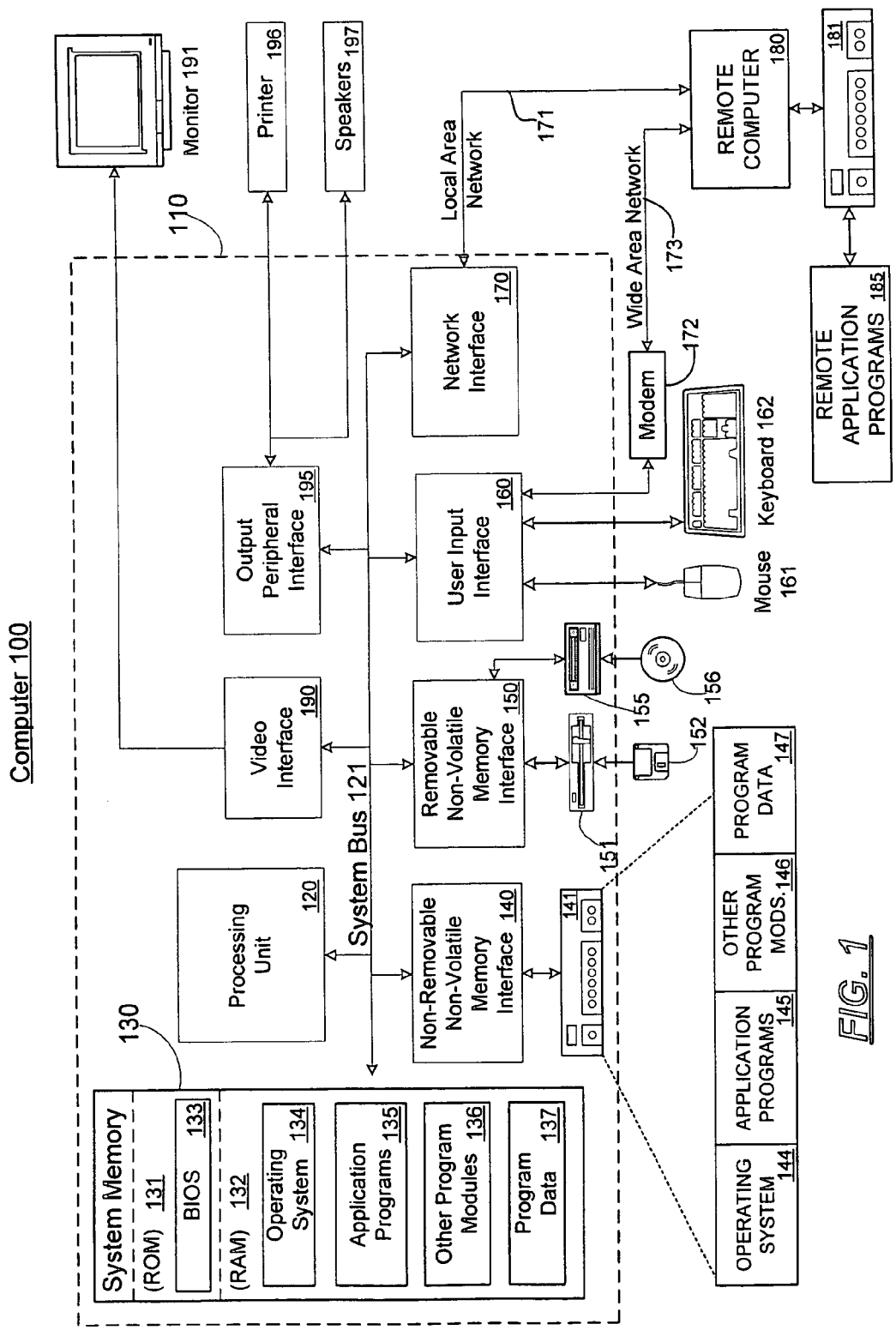
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Database Tables and Operations Thereon

Modern database systems, particularly those based on the relational model, store data in the form of tables. A table is a collection of data organized into rows and columns. FIG. 2 shows an exemplary table 200. In this example, table 200 is a list of bank customers, showing each customer's branch and balance. Table 200 has rows 202 and columns 204. Each column 204 has a name 206. Table 200 may also have a name 208. In the example of FIG. 2, table 200 has the name 208 "Customers." Table 200 has three columns 204. The names 206 of columns 204 are "cust_name," "branch," and "balance," respectively. The first row 202 of table 200 contains the data "James," "Key West," and "$1000." In the terminology of database systems, table 200 is sometimes referred to as a "relation," each row 202 as a "tuple," and the name 206 of each column as an "attribute." It will be appreciated that the depiction of table 200 in FIG. 2 is merely exemplary. A table may have any number of rows and columns, and may store any type of data, without departing from the spirit and scope of the invention.

Database systems often make use of the "relational algebra," which is a system of operations that can be performed on tables. In general, the relational algebra includes a set of operators that take one or more tables as operands and produce a new table as a result. One important operation in the relational algebra is the "Cartesian product." Cartesian product is a binary operation that takes two tables as operands and produces a third table as a result. The Cartesian product of two tables R and S (written as R×S) is formed by pairing each row of R with all the rows of S.

FIG. 3 shows an example of the Cartesian product of table 200*a* and 200*b*. Table 200*a* has three columns ("emp_name," "dep't," and "salary"), and table 200*b* has two columns ("dep't" and "bldg"). The Cartesian product of tables 200*a* and 200*b* is a third table 200*c* having five columns. It will be observed that the five columns of table 200c are the three columns of table 200a plus the two columns of table 200b. (In FIG. 3, the name of each column in the product table indicates the name of the table from which that column originated. Thus, the first column is named "Employees.emp_name," the second column "Employees.dep't," etc.) Each row of table 200c is formed by taking a row of table 200a and pairing it with all of the rows of table 200b. Thus, the first row of table 200c is formed by concatenating the first row of table 200a with the first row of table 200b. The second row of table 200c is formed by concatenating the first row of table 200a with the second row of table 200b. After the rows of table 200b have been exhausted, the next row of table 200a is paired with each row of table 200b to produce the third and fourth rows of table 200c. The process is repeated for each row of table 200a until all the rows of table 200a have been exhausted. It will be appreciated that if table R has $R_R$ rows and $R_C$ columns, and table S has $S_R$ rows and $S_C$ columns, then the Cartesian product R×S is a table having $R_R S_R$ rows and $R_C+S_C$ columns.

Usually the information sought from a database system is not the entire Cartesian product of two tables, but rather selected rows of the Cartesian product. In this case, a "join" of the two tables may be performed. A join is the Cartesian product of two tables, where particular rows of the resulting Cartesian product are selected according to a predicate. Specifically, the join of two tables $R \bowtie_P S$ is those rows of R×S that satisfy the predicate P.

Figures 4, 5:
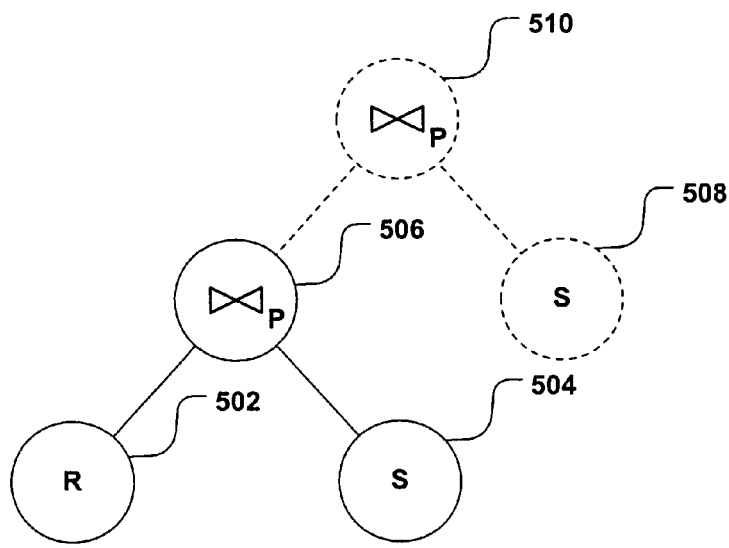
FIG. 4 is a block diagram showing an exemplary join of two tables.
FIG. 5 is a block diagram of a first exemplary expression tree.

FIG. 4 shows an example of a join. Specifically, table 200d is the table that results from performing a join on tables 200a and 200b, where the predicate P is "Employees.dep't=Department.dep't." As discussed above, FIG. 3 shows the Cartesian product 200c of tables 200a and 200b. Thus, the join of tables 200a and 200b using the predicate P consists of all of the rows of table 200c that meet the condition "Employees.dep't=Dep't.dept." A row meets the predicate P if the value of Employees.dep't for that row is equal to the value of Dep't.dept for that same row. As shown in FIG. 4, this condition is met by rows 1, 4 and 5 of table 200c, and thus table 200d consists of those three rows of table 200c. Rows 2, 3, and 6 of table 200c have different values in the Employees.dep't and Department.dep't columns; thus, rows 2, 3, and 6 do not meet the predicate P and are not included in the result of $R \bowtie_P S$.

The join operation demonstrated in FIG. 4 is a particular type of join called an "inner join." It will be recognized by those of skill in the art that there are various types of joins, of which the inner join is a non-limiting example. Other types of join operations include the "semijoin" and the "anti-semijoin." The semijoin of tables R and S (written $R \ltimes S$) is the table consisting of all rows of table R that agree with at least one row of table S for all columns that R and S have in common. The anti-semijoin of tables R and S (written $R \overline{\ltimes} S$) is the table consisting of all rows of table R that do not agree with any row of table S for those columns that R and S have in common. When tables R and S have the same set of columns (i.e., each column in R has a corresponding column in S with the same column name, and vice versa), then $R \ltimes S$ is the table consisting of all rows in R that appear in S, and $R \overline{\ltimes} S$ is the table consisting of all rows in R that do not appear in S. Semijoin and anti-semijoin can be further generalized by adding a predicate P. Thus, $R \ltimes_P S$ consists of those rows of R that agree with any row of S that satisfies the predicate P, and $R \overline{\ltimes}_P S$ consists of those rows of R that do not agree with any row of S that satisfies the predicate P.

For general information on relational databases, see J. D. Ullman, *Principles of Database and Knowledge-Base Systems*, vol. 1 (W. H. Freeman & Co., 1988).

Expression Trees

An expression in the relational algebra may be represented as an expression tree. When an expression is represented in this manner, the operator is represented as a node in the tree, and the operand(s) is (are) represented as the child (children) of the operator node. For example, the expression $R \bowtie_P S$ may be represented by the tree shown in FIG. 5. In this example, node 502 represents table R, node 504 represents table S, and node 506 represents the join operation performed on nodes 502 and 504. Nodes 502 and 504 are children of the operator node 506. Since the result of the join operation is, itself, a table, the tree represented by nodes 502, 504, and 506 may actually be a sub-tree of a larger tree that represents a larger expression. For example, it may be necessary to join the result of $R \bowtie_P S$ with another table, T (i.e., $(R \bowtie_P S) \bowtie_P T$). In this case, node 508 represents table T, and node 510 represents the join of T with $R \bowtie_P S$. Thus, the children of node 510 are node 508 and 506, representing that the two operands of the join at node 510 are (1) T, and (2) the result of $R \bowtie_P S$. In this manner, an arbitrarily complex algebraic expression can be represented as a tree.

Figure 6:
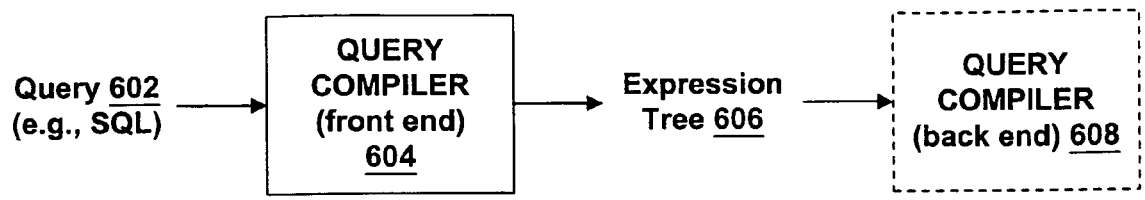
FIG. 6 is a block diagram of a query compiler.

A database system may produce an expression tree as an intermediate step in the process of compiling a query. A query is a description of a result that is sought from a database system. Typically, the query is written in a query language such as the Structured Query Language (SQL). It will be appreciated that SQL is a non-limiting example of a query language, as any other query language may be used without departing from the spirit and scope of the invention. FIG. 6 depicts the process of converting a query into an expression tree. Query 602 is received by the "front end" of query compiler 604. Query compiler 604 parses the query and determines what algebraic operations may be performed on tables in the database in order to satisfy the query. These algebraic operations are represented in the form of expression tree 606, which is produced as output by the front end of query compiler 604. Expression tree 606 may then be provided to a "back end" 608 of the query compiler, which creates an "execution plan" for evaluating the expression tree.

Optimization of Expressions

Figure 7:
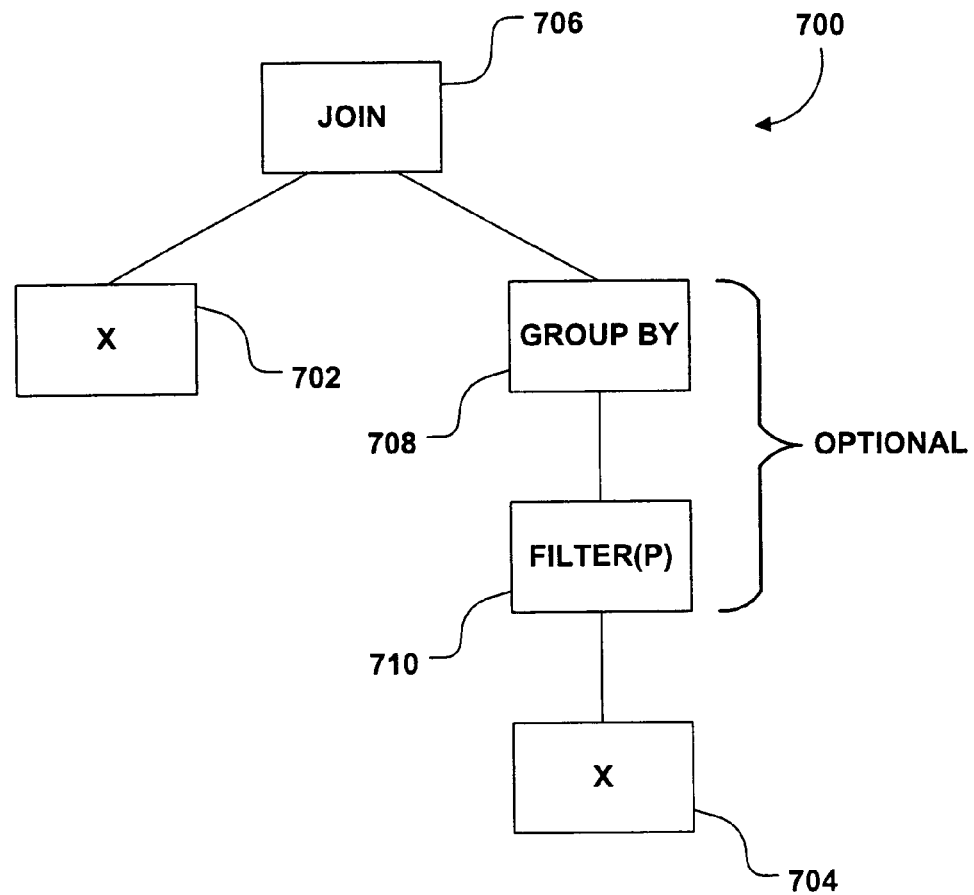
FIG. 7 is a block diagram of a second exemplary expression tree.

FIG. 7 shows a particular type of expression tree that may be evaluated in accordance with the techniques of the present invention. Expression tree 700 includes nodes 702 and 704, each of which is an instance of the table X. As will be appreciated from the above discussion, X may be a table stored within the database system. Alternatively, X may be a materialized or non-materialized "view" of data in the database system, or X may be the result of an algebraic sub-expression. In the example of FIG. 7, however, it is significant that nodes 702 and 704 both represent instances of the same table X. The process by which a common table X (or, more generally, a common sub-expression X) may be identified within an expression tree is generally known in the art and is this not provided in detail herein. Certain pattern-matching techniques that can be used to identify sub-expressions are described in U.S. patent application Ser. No. 09/671,458, entitled "Cost Based Materialized View Selection for Query Optimization," which is incorporated by reference herein.

The two instances of table X represented by nodes 702 and 704 are operands of join 706. Optionally, the instance of table X represented by node 704 may be processed by group-by operator 708 and/or filter 710, in which case one of the operands of join 706 is the table resulting from these group-by and filter operations, rather than the unmodified table X. Group-by operation 708 is a unary operation that segments a table according to the values of one or more columns. If R is a relation, c is a set of columns and e is a set of aggregate functions, then group-by(c, e, R) has as many rows as distinct values of c in relation R. The aggregate functions e are applied to each group of rows having the same values of c, and the output of the group-by operator includes columns c and results of the aggregate expressions e. Filter operation 710 selects certain rows from a table according to a predicate. Thus, if R is a table and P is a predicate, then filter(P, R) is the table having only those rows of R that satisfy predicate P. In this sense, filter 710 is equivalent to the basic relational algebra operator σ. Thus, the notation filter(P, R) is equivalent to the traditional algebraic notation σPR.

The following is an example of a SQL query that results in an expression tree of the form depicted in FIG. 7:

| Query 1 |
|---|
| Select emp_name from employees E1<br>where E1.salary > ( select avg(E2.salary)<br>from employees E2<br>where E2.dept = E1.dept) |

In query 1, "employees" refers a table in the form of table 200a (shown in FIG. 3). Query 1 produces a list of employees who make more than the average salary in their department. If query 1 is provided as input to a query compiler 604 (shown in FIG. 6), the compiler may produce an expression tree of the form shown in FIG. 8.

Figure 8:
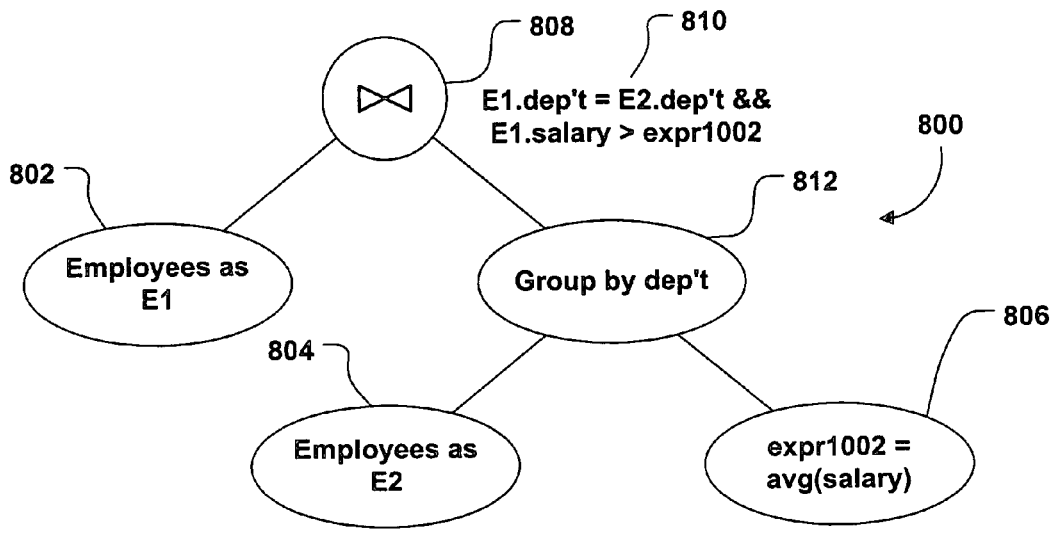
FIG. 8 is a block diagram of a third exemplary expression tree.

The expression tree 800 in FIG. 8 includes an inner join operator 808. The operands to join 808 are (a) a first instance of the employees table, and (b) an expression involving a second instance of the employees table. The first instance of the employees table is called "E1," and the second instance of the employees table is called "E2." E1 is represented in the tree by node 802, and the expression involving E2 is represented by nodes 804, 806, and 812. The group-by sub-expression represented by nodes 804, 806, and 812 means that the rows of table E2 are grouped by distinct values of table E2's "dep't" column, and the average value in the salary column is computed for each group of rows. The output of group-by node 812 is a table having one row for each distinct "dep't" value in E2; each row includes (a) a distinct "dep't" value; and (b) the average salary for the group of E2 rows that have that distinct "dep't" value. (The column containing the averages is assigned the arbitrary label "expr1002.") The tables represented by nodes 802 and 812 are the operands for the inner join at node 808.

It will be observed at this point that expression tree 800 is in the form shown in FIG. 7. That is, it includes two instances of the same table (the "employees" table) on two sides of a join, with one of the instances (instance E2) being changed only by group-by or filter operations. (Expression tree 800 actually contains no filter operation on E2; rather, E2 is modified only by a group-by operation.) As discussed below, a particular type of optimization in accordance with the invention can exploit the fact that expression tree 800 has this form.

As previously indicated, the inner join of two tables is the Cartesian product of those tables, less any rows of the product that do not satisfy the join predicate. Thus, the Cartesian product of the tables represented by nodes 802 and 812 is:

| Employees as E1 | | | | Employees as E2 | | | | | E1.emp_name | E1.dep't | E1.salary | E2.emp_name | E2.dep't | E2.salary | expr1002 |
|---|---|---|---|---|---|---|---|---|---|---|---|---|---|---|---|
| emp_name | dep't | salary | | emp_name | dep't | salary | expr1002 | | | | | | | | |
| Mike | DBMS | 1000 | | Mike | DBMS | 1000 | 1500 | | Mike | DBMS | 1000 | Mike | DBMS | 1000 | 1500 |
| Janice | Legal | 5000 | × | Janice | Legal | 5000 | 5000 | = | Mike | DBMS | 1000 | Janice | Legal | 5000 | 5000 |
| Laura | DMBS | 2000 | | Laura | DBMS | 2000 | 1500 | | Mike | DBMS | 1000 | Laura | DBMS | 2000 | 1500 |
| | | | | | | | | | Janice | Legal | 5000 | Mike | DBMS | 1000 | 1500 |
| | | | | | | | | | Janice | Legal | 5000 | Janice | Legal | 5000 | 5000 |
| | | | | | | | | | Janice | Legal | 5000 | Laura | DBMS | 2000 | 1500 |
| | | | | | | | | | Laura | DBMS | 2000 | Mike | DBMS | 1000 | 1500 |
| | | | | | | | | | Laura | DBMS | 2000 | Janice | Legal | 5000 | 5000 |
| | | | | | | | | | Laura | DBMS | 2000 | Laura | DBMS | 2000 | 1500 |

The Cartesian product shown above is not the complete join called for by expression tree 800, because predicate 810 has not been applied. Predicate 810 requires two conditions for a row to appear in the final table: (1) E1.dep't=E2.dep't for a given row; and (2) E1.salary>expr1002. Putting aside the second condition for a moment, it is readily observed that rows that do not have matching values in the E1.dep't and E2.dep't column can never meet the first condition. In other words, it is never necessary to combine rows of E1 and E2 having different dep't values, since such a combination of rows will never be included in the final join result under the given join predicate, P. This observation can be exploited in order to optimize the evaluation of the join.

Specifically, when the expression tree is of the form shown in FIG. 7 and the join predicate is, or conjunctively includes, an equality comparison between two columns having the same name, say A, the join need not be performed on an entire table. Rather, the table may be segmented into groups of rows that have the same value in column A. Then, the join can be performed on just the rows in a given segment. In this example, since a row having the value "DBMS" in the dep't column will never join with a row having the value "Legal" in the dep't column, there is no need to combine these rows. It may be more efficient to collect all rows from the "employees" table having "DBMS" in the dep't column (i.e., the "dep't=DBMS" segment of the "employees" table), and then to combine the E1 and E2 instances of just the rows in that segment. The process can then be repeated for the "dep't=Legal" segment of the "employees" table. The advantages of this technique include: (1) resources are not wasted combining rows that can never be included in the final join result; and (2) rows of the input relation can be buffered ("spooled") a segment at a time in order to perform the join, even if the entire table is too large to fit in the buffer.

In order to perform per-segment evaluation of the join, a new operator called "GbApply" is introduced for use in the expression tree. The "Gb" in the name of the GbApply operator stands for "group-by." Like the "group-by" operator discussed above, GbApply groups rows of a table into segments based on the value(s) of one or more columns. However, unlike the group-by operator, which applies scalar aggregate expressions to each group, GbApply applies a relational expression. GbApply takes two operands. The first operand is the table that is common to both sides of the join. The second operand is a "relational fragment" (e.g., a join expression) that has been rewritten to operate on segments of the input table rather than on the entire table.

Figure 9:
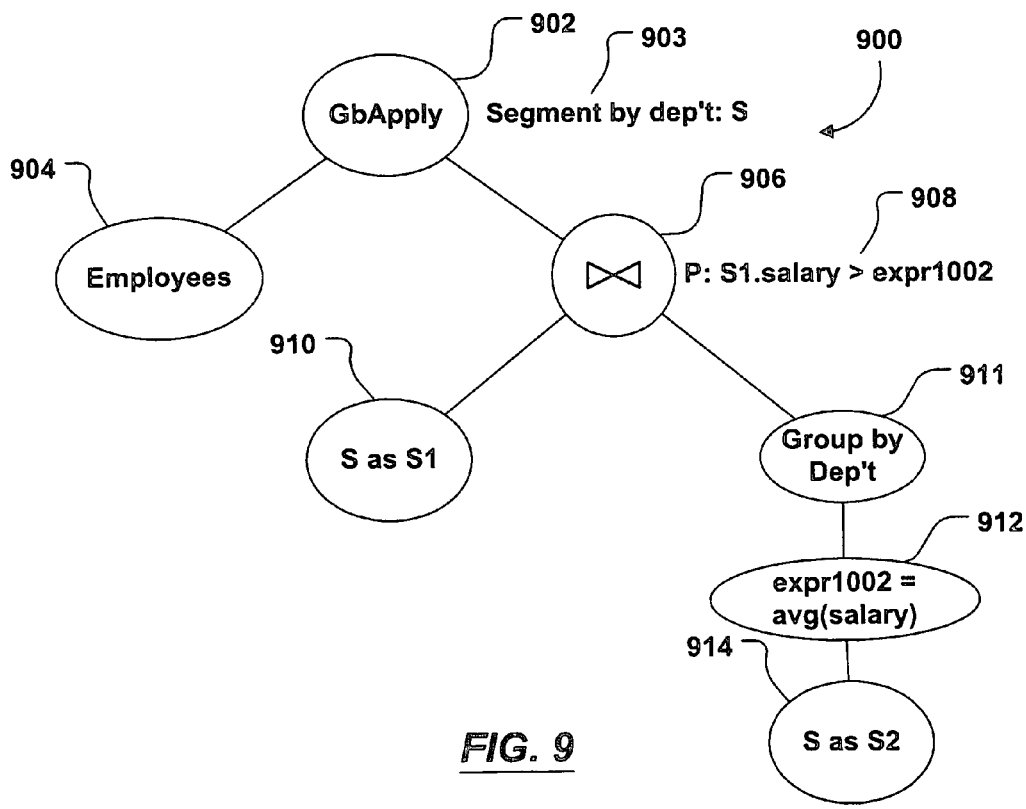
FIG. 9 is a block diagram of a fourth exemplary expression tree, which incorporates a GbApply operator.

For example, FIG. 9 shows an expression tree 900, which is equivalent to expression tree 800 (shown in FIG. 8) except that it has been rewritten to use the GbApply operator. The GbApply operator itself appears as node 902. GbApply node 902 is associated with instructions as to which column(s) is (are) to be used as the segmenting column(s). In this case, "dep't" is to be used as the segmenting column, since it has been determined, as discussed above, that only rows with like values in the "dep't" column need to be joined. S is a variable that is used in the rewritten join expression to refer to the segments of the input table. GbApply node 902 has a first operand at node 904, which in this example is the "employees" table. Node 906 represents the join from the original expression tree 800. However, the predicate 908 associated with join node 906 does not include the equality comparison between the two instances of the "dep't" column, which is present in the original predicate 810; it is not necessary to make this comparison in expression tree 900, because segmentation ensures that rows having different values in their dep't columns will not join. Instead, predicate 908 includes only the other conjunct in the original predicate—i.e., the condition that salary is greater than expr1002. Node 910 represents the first instance of the table segment S, and assigns the label S1 to that instance. Nodes 911 and 912 specify that the average salary value for a table segment (segmented by the "dep't" column) is to be computed and assigned the label "expr1002." The table segment on which this average is computed is the second instance of S represented at node 914; this second instance is assigned the label S2.

Figure 10:
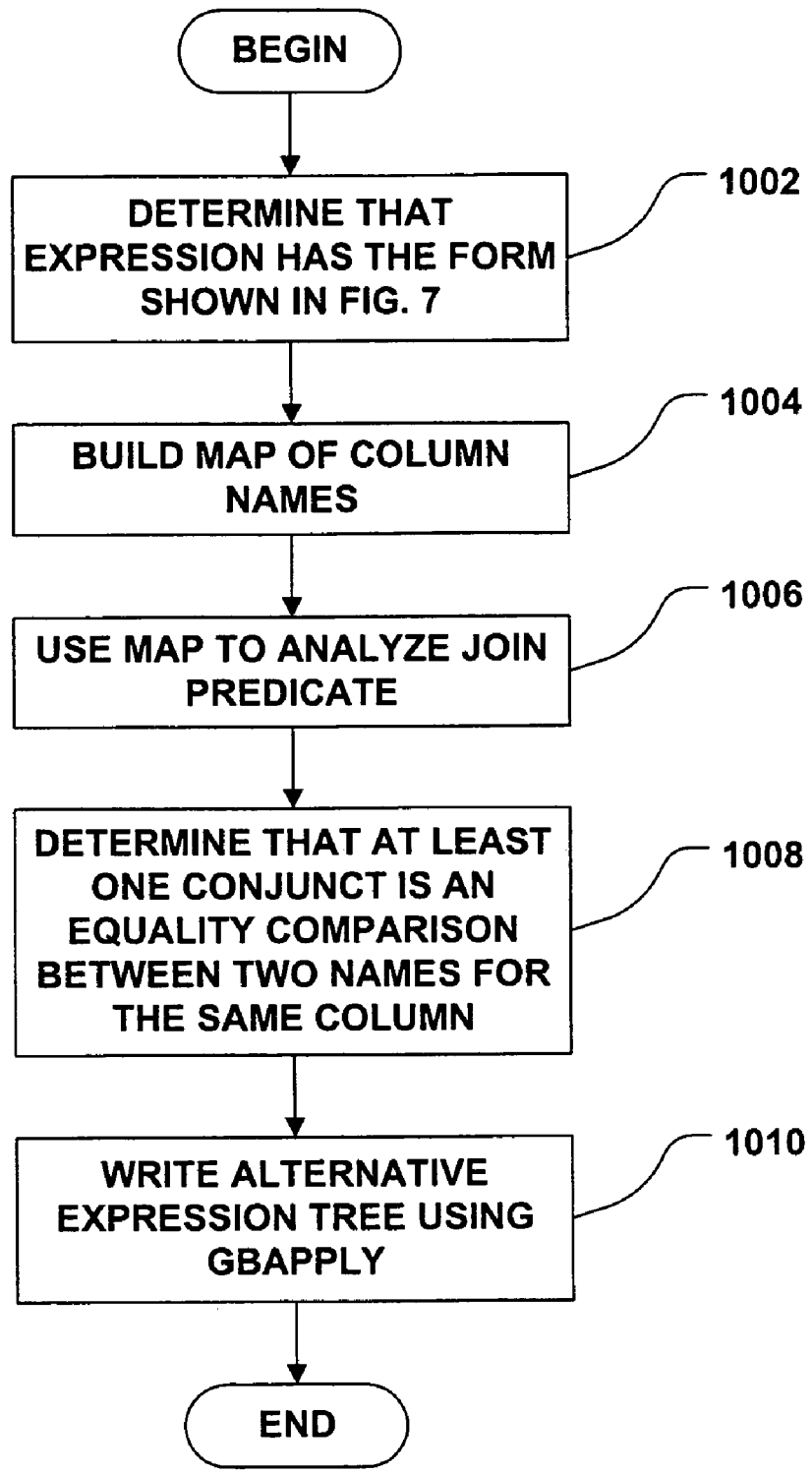
FIG. 10 is a flow diagram of an exemplary process for analyzing an expression tree and for incorporating a GbApply operator into an expression tree.

FIG. 10 shows a process for identifying expression trees (or sub-trees) that are candidates for rewriting with the GbApply operator, and for rewriting those trees. First, at step 1002 a determination is made that an expression tree has the form shown in FIG. 7. This process is performed using a pattern matching mechanism. Pattern matching mechanisms are known in the art and are present in typical query compilers. As noted above, some pattern matching techniques are discussed in U.S. patent application Ser. No. 09/671,458. After the pattern matching has been performed, the relational expressions on both sides of the join are compared to determine whether they are identical (i.e., that they are both the same relation X) except for a residual predicate and/or a residual aggregate. It should be observed that the two expressions may be identical up to the names used for the columns; they cannot use the same names, as then it would be impossible to identify in the join result which instance of the expression the column came from.

As part of the process of matching the two expressions, a map M of names for identical columns is created (step 1004). Next, map M is used to analyze the join predicate in the expression tree (step 1006). In order to analyze the predicate, the predicate is converted to the conjunctive normal form, and the conjuncts are separated out. When the predicate is analyzed, it is determined (at step 1008) whether at least one of the conjuncts is an equality comparison between two names for the same column. If any of the conjuncts is such an equality comparison, then the column referenced in the equality comparison is included on a list S. The list S indicates how to segment the relation X so that it is not necessary to spool all the rows of the relation at a single time in order to perform the join. As indicated above, if the predicate contains an equality comparison of columns S, then a first row of relation X can only join with those rows of relation X having the same value(s) in columns S as the first row, so it is not necessary to spool the entire relation X at one time in order to perform the join. Rather, relation X can be spooled on a per-segment basis, where the segments are created according to columns S. This works for the following reason: Suppose that two rows (e.g., $row_{left}$ and $row_{right}$) of two instances of relation X differ in columns S. $Row_{left}$ and $row_{right}$ cannot join because columns S are compared for equality in the join predicate. Suppose further that $row_{result}$ is the row that results from applying the optional operators, select and group-by, to $row_{right}$. Since both select and group-by do not change the values of the input columns, $row_{result}$ and $row_{left}$ must differ in values for columns S and therefore cannot match. This means that at any time, it is only necessary to consider rows that have same values for columns S while performing the join, and this fact is not affected by the application of optional filters and aggregates to relation X. Therefore, relation X may be segmented into groups with same values for columns S, and each group is considered one at a time in performing the join.

Once it is determined that an equality comparison as described above is present in the join predicate, an alternative expression tree using the GbApply operator is created (step 1010). As shown in the example of FIG. 9, the information that is attached to the GbApply operator includes the relation to be segmented (e.g., node 904 in FIG. 9), the segmenting columns (e.g., reference number 903 in FIG. 9), and the expression tree fragment for the operation to perform on each of the segment (e.g., nodes 906-914 in FIG. 9). The input to the GbApply operator is the relation X. Since there is only one instance of relation X in the resulting tree, a remapping project is created that ensures that the names provided by the other instance of the relation X are available above the substitute. Such a remapping project can be built using the map M created at step 1004.

The process of FIG. 10 may be applied to expression tree 800 (shown in FIG. 8), and may result in expression tree 900 (shown in FIG. 9). It should be observed, however, that creating an alternative expression tree in this manner is only a potential optimization—i.e., depending on circumstances, it may be more or less efficient to execute the GbApply expression than it is to execute the non-optimized expression. While GbApply does reduce the use of certain resources (e.g., spooling space, etc.), it may consume other resources. For example, in order to perform a segmented join using GbApply, the table must be segmented, which means that memory and processor time must be consumed in order to segment the relation (which may require sorting relation X on columns S, if no existing index provides the necessary sort order). Thus, whether the final plan for satisfying a query includes the GbApply operator may be determined by using an estimate of cost of execution. If the average size of each segment is small and if the cost of obtaining relation X in sorted order is not large, the cost of the GbApply strategy is typically lower than double evaluation of common relation X. A query compiler may include the step of comparing the estimated cost of various expression trees or fragments thereof in order to determine the most efficient method of satisfying the query.

Execution Strategy

Figure 11:
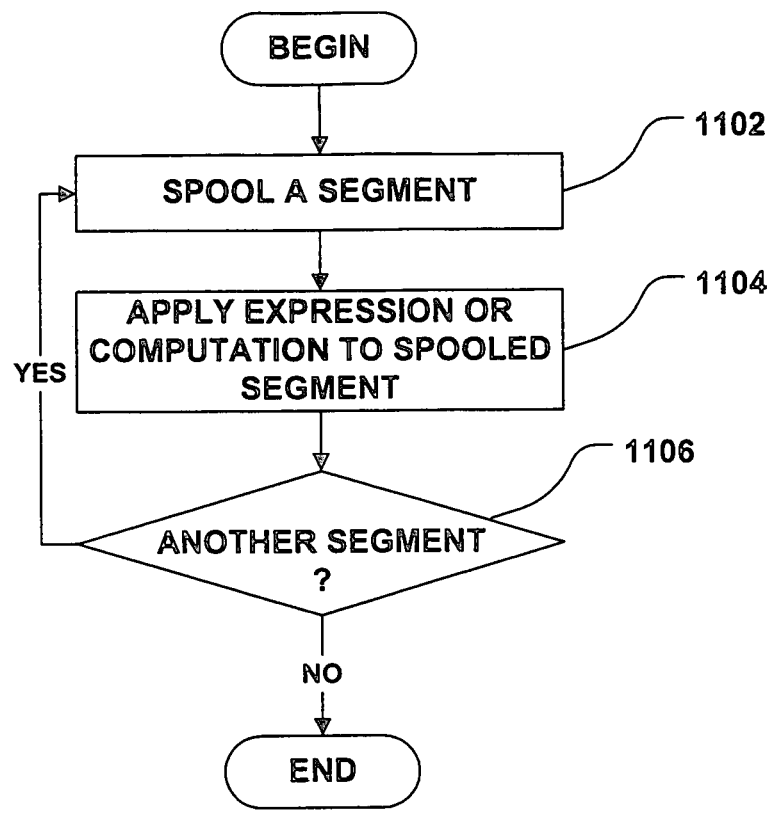
FIG. 11 is a flow diagram of an exemplary process for per-segment evaluation of a join.

As discussed above, in certain cases where different instances of the same relation appear on both sides of a join, it may be more efficient to perform the join on a per-segment basis, and that a per-segment join may be specified in an expression tree using the GbApply operator. FIG. 11 shows the process of performing a join on a per-segment basis.

Referring now to FIG. 11, at step 1102 a segment of a table X is spooled. Table X may be segmented using the columns S identified by the process of FIG. 10. As one example of the spooling performed at step 1102, an area of memory may be designated for buffering rows of a table, and step 1102 may comprise copying the segment into that area of memory. At step 1104, an expression or computation (e.g., a join) is applied to the spooled segment. The particular join operation that is applied is the join represented by the expression tree fragment attached to a GbApply operator at step 1010 of FIG. 10.

After the join operation has been applied to the segment, a determination is made at step 1106 as to whether there are additional segments of table X to be spooled. If there are additional segments, then the process returns to step 1102, whereupon the next segment is spooled. If it is determined at step 1106 that there are no additional segments to be spooled, then the per-segment application of the join is complete, and the process terminates.

In a preferred embodiment, the process of applying a join on a per-segment basis, as shown in FIG. 11, may be carried out using two iterators called SegSpool ("segmented spool") and SegApply ("segmented apply"). SegSpool places the rows of a segment into a "spool" (i.e., a buffer), and SegApply applies a relational fragment (i.e., the right child of a GbApply operator node) to the spooled rows. Each iterator has a method called GetRow( ). Pseudo-code for the SegSpool::GetRow( ) and SegApply::GetRow( ) methods is provided below:

TABLE 1

SegSpool::GetRow( )

```
SegSpool::GetRow( )
{
  // if the row we saw in the last call was EOF we are done
  if (last_result == EOF)
  {
    return EOF;
  }
  // otherwise load the spool
  while(TRUE)
  {
    Spool.SpoolRow(last_result);
    result = Child.GetRow( );
    if (result == EOF)
    {
      // we have loaded the last segment
      // set up so that we can return EOF on the next call
      last_result = EOF;
      return empty_row;
    }
    else if(SegmentColumnsDifferent(result, last_result))
    {
      // the new row does not belong to this segment so we
      // are done loading the spool.
      last_result = result;
      return empty_row;
    }
    else
    {
      last_result = result;
    }
  }
}
```

TABLE 2

SegApply::GetRow( )

```
SegApply::GetRow( )
{
  while (TRUE)
  {
    // try to get a row
    result = RightChild.GetRow( );
    if (result == EOF)
    {
      // load the next segment
      result = SegSpool.GetRow( );
      if (result == EOF)
      {
        // no segments left
        return EOF;
      }
      // we did load a new segment so try again
      continue;
    }
    else
    {
      // return the row
      return result;
    }
  }
}
```

SegSpool::GetRow( ) spools rows of a relation X. SegSpool::GetRow( ) expects that relation X is grouped on segmenting columns S. This may be accomplished by providing the contents of X in sorted order, either by an explicit sort operation, or by reading an existing index that outputs its contents in sorted order. Also, grouping can be obtained on the result of some joins, without having sorted output. For example, if departments are joined with employees using some form of NestedLoops algorithm, such that for each department, all its employees are found and output, then all the rows that contain a particular department will appear together in the output—i.e., the output will be grouped by distinct values of the department column, even though the groups are not necessarily in sorted order. As will be appreciated from the pseudo-code in Table 1, SegSpool::GetRow adds successive rows of its input relation to a spool (using the method Spool.SpoolRow( )), and continues to add these successive rows so long as the segmenting columns of the current row have the same values as the segmenting columns of the last row spooled. SegSpool::GetRow( ) returns once it encounters a row that has different segmenting columns from the previously-spooled row. When such a row is encountered, it is saved in last_result, so that the row may be spooled the next time SegSpool::GetRow( ) is called to spool the next segment.

The loading of the SegSpool and manipulation of each segment is performed by another iterator called Segmented Apply (SegApply). When GetRow is called on SegApply, it first loads a segment in SegSpool. SegApply::GetRow then calls GetRow on the relational fragment that uses the segment to generate the results, until no more rows are obtained from the relational fragment. At this point, it moves again to the SegSpool side to load the next segment. This is the standard execution of a NestedLoops iterator. (As shown in FIG. 9, the relational fragment is the right child of the GbApply node; thus, in the pseudo-code of Table 2, it is assumed that a method RightChild.GetRow( ) exists which returns the next row that results from applying the relational fragment (e.g., the join) to the spooled segment). It should be noted that not all calls to SegApply::GetRow( ) result in calls to SegSpool::GetRow( ) since the relational fragment may generate more than one row per segment. SegApply: :GetRow( ) only calls SegSpool::GetRow( ) when the relational fragment indicates that it can no longer produce any rows using the current segment. In this case, SegSpool::GetRow( ) is called in order to spool the next segment.

Figure 12:
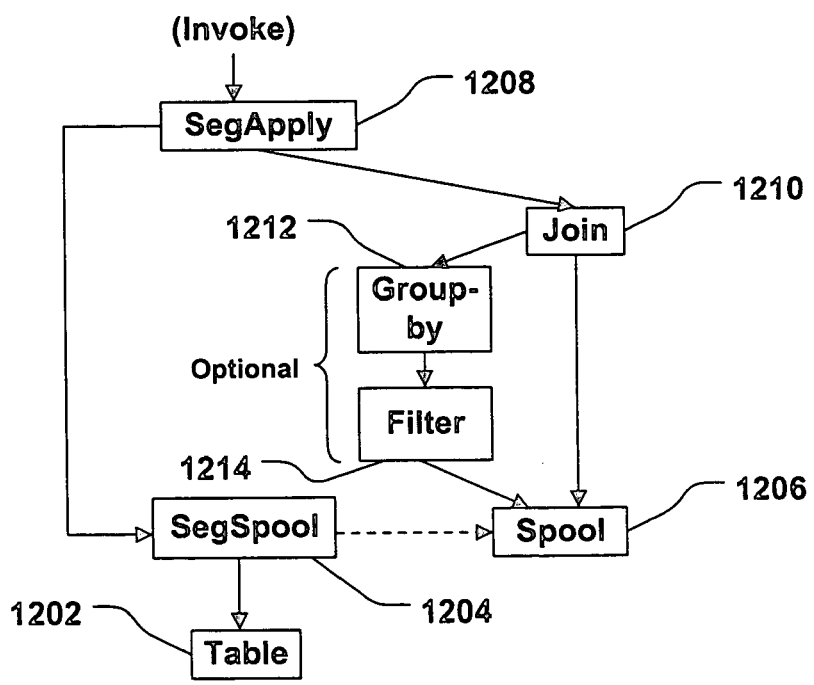
FIG. 12 is a block diagram showing the interaction between the SegSpool and SegApply iterators.

FIG. 12 shows how SegSpool and SegApply work together. Block 1202 represents a table, such as the table X that appears on both sides of the join in expression tree 700 (shown in FIG. 7). Table 1202 is accessible by SegSpool (block, and is the source of the table rows that SegSpool::GetRow( ) puts into the spool 1206. SegSpool 1204 is invoked by SegApply (block 1208). Whenever SegApply 1208 needs to fill the spool with a new segment (e.g., because the spool is empty, or because the last segment has been exhausted), SegApply 1208 calls SegSpool::GetRow( ) to fill the spool with more rows (i.e., the rows of the next segment). When the spool is filled with a new segment, SegApply invokes the portion of the expression tree that operates on the segment. As indicated in the diagram, this expression tree includes a join (block 1210), an optional group-by or other aggregate operator (block 1212), and an optional filter (block 1214). Both sides of the join 1210 lead to spool 1206; spool 1206 is the source of rows for both sides of join 1210. When the expression tree has been invokes one or more times and indicates that it is not able to produce any new rows, SegApply once again calls SegSpool::GetRow to fill the spool with the rows from the next segment, and then calls the expression tree fragment to perform the join on that segment.

Extended Uses of the SegSpool and SegApply Iterators

GbApply can specify any operation that needs to look only at a group of rows at a time, and its execution is performed by the SegApply and SegSpool iterators discussed above. It should be appreciated that a join whose predicate conjunctively includes an equality comparison between equivalent columns is merely one example of an operation that can be performed on a table on a per-segment basis.

When the expression operating on each segment has a single usage of such segment, there is no need to physical copy each row in a spool, before it is processed by the per-group expression. In this case, SegApply/SegSpool present the illusion of a spool through the same interface to other iterators, but preferably route spool read requests directly to the child of SegApply and indicate "end of spool" when a new segment is encountered. Since there were multiple, non-synchronized readers in the join examples presented above, it was necessary to spool. The following are examples in which there is a single usage of the segment, so it is possible to optimize by not actually storing any rows.

An example of an operation that can be performed on a table on a per-segment basis without physically copying segments to a spool is a "major-minor sort." A major-minor sort is the situation where an input table is sort on columns A and B and it is desired to sort the output on columns A, B, C and D. SegSpool can be used to separate rows with the same values for columns A and B, since the rows are sorted by these columns. (As discussed above, in a preferred embodiment SegSpool expects its input table to be grouped on the segmenting columns.) SegApply can then use a relational fragment to sort these groups on columns C and D. The output will be sorted by columns A, B, C, D as desired. When SegSpool and SegApply are used in this manner, the spool has only one "consumer" (i.e., there are not several objects that need to access the spooled segment—only the sorting routine needs to access the spooled segment). Thus, in a preferred embodiment when SegSpool and SegApply are used for a major minor sort, SegSpool is used only to indicate segment boundaries in an existing table; it is not necessary for SegSpool to actually copy the rows into the spool.

Another use of the iterators is the calculation of the "superlative" aggregates, such as "min" and "max." This used of the iterators is derived from the fact that when rows are appropriately sorted, the aggregates min and max can be calculated by using the "top" operator. For example, if an "employees" table (such as table 200a, shown in FIG. 3) is sorted on both the "dep't" and "salary" columns, and if the table is then segmented on the "dep't" column, then each segment will begin with a row having the minimum salary for that department. This provides a convenient way to compute "min(salary)" for each department: we examine the first row in each segment and read its salary column. As in the case of major-minor sort, it is preferable for SegSpool not to actually spool the rows of the table, but merely to identify the segment boundaries so that the first row in each segment can be located. (As previously noted, "max(salary)" can be computed by taking the first row when the salary column is sorted in reverse order.)

Figure 12A:
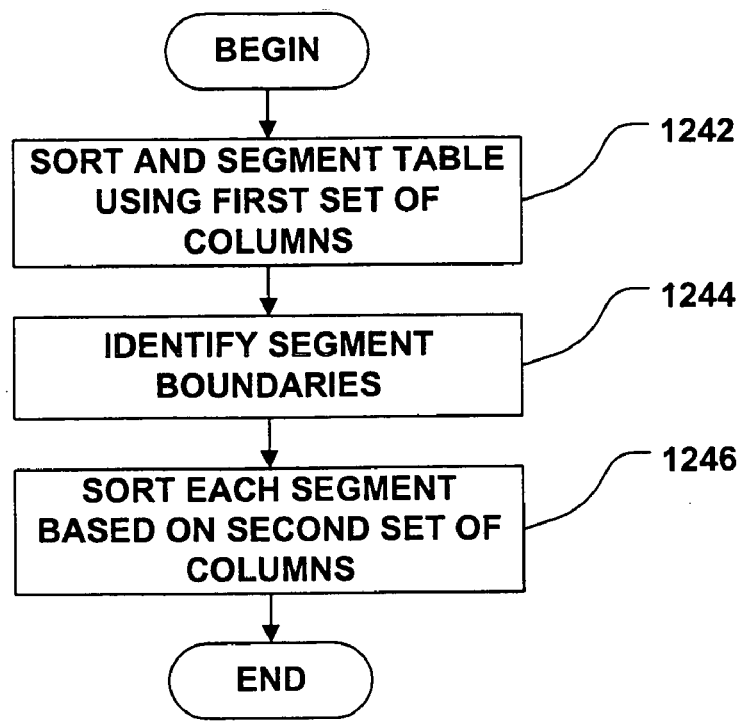
FIG. 12A is a flow diagram of an exemplary process for performing a major-minor sort in accordance with aspects of the invention.

FIG. 12A shows a process of performing a major-minor sort using segmentation. At step 1242, a table is sorted and segmented based on a first set of columns. That is, the rows of a table are sorted based on a first set of columns, and the table is then segmented such that rows of the table having common values in the first set of columns are grouped together. In this case, the input table to SegSpool is not only grouped, but also sorted on the set of segmenting columns. Thus, when a table has already been sorted on a first set of columns and needs to be segmented based on these same columns, SegSpool is ideally suited to perform the segmentation.

At step 1244, the segment boundaries are identified. SegSpool may perform this identification by repeatedly retrieving the next row in the table until it encounters a row whose segmenting columns have values that differ from the last row. Information that identifies the first and last row in the segment is then saved. At step 1246, each segment is sorted based on a second set of columns. This sort may be performed by calling SegApply::GetRow, where the "relational fragment" (i.e., RightChild.GetRow( )) is a function that sorts based on the second set of columns. In this case, an expression tree for the minor sort may be a GbApply expression, where the input to GbApply is the "major" sorted table (i.e., the table sorted on the first set of columns), and the relational fragment that is to be applied to the input table on a per-segment basis is a "minor" sort (i.e., a sort on the second set of columns) instead of the join in the previous GbApply examples.

It should be noted that the identification of segment boundaries by SegSpool is an optimization. SegSpool could copy the rows of a segment into a spool, and then perform the "minor" part of the sort (i.e., the sort on the second set of columns) on the spooled rows. However, as discussed above it is unnecessary to spool the rows in this case; when the only operation being performed on a segment is a sort, the segment may be sorted "in-line" in the original table simply by identifying the original segment boundaries.

Figure 12B:
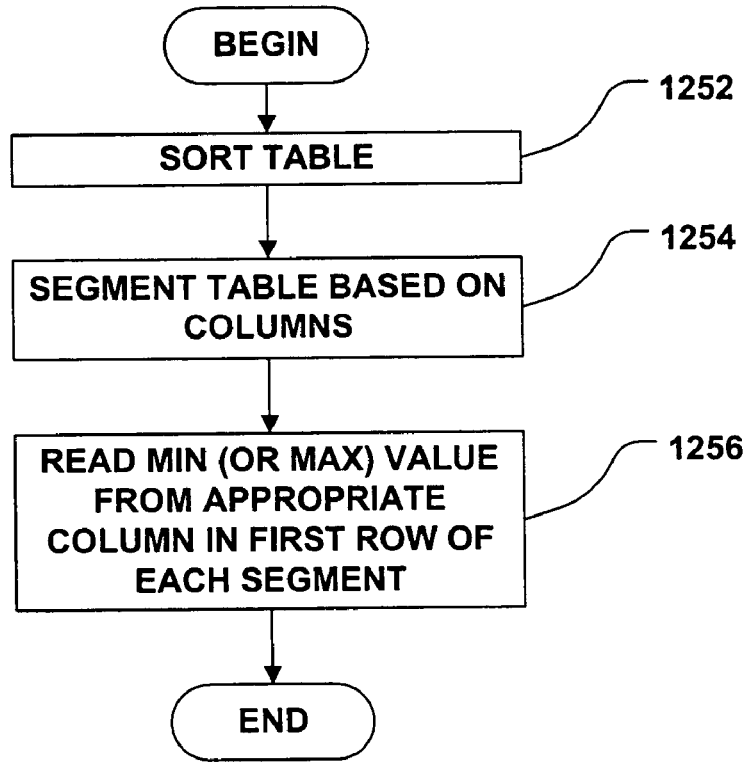
FIG. 12B is a flow diagram of an exemplary process for evaluating a superlative aggregate in accordance with aspects of the invention.

FIG. 12B shows a process of computing a min or max value using segmentation. At step 1252, the table on which a min (or max) value is to be computed is sorted. The sort is performed first on the grouping columns, and then on the column for which the min (or max) value within the group is needed. For example, in an "employees" table (such as table 200a, shown in FIG. 3), if it is desired to find the minimum salary within each department, the table can be sorted first on the "dep't" column, and then on the "salary" column. This sort may be performed using the major-minor sort procedure described above in connection with FIG. 12A. If a max value is to be computed, then the "salary" column is sorted in reverse order.

At step 1254, the table is segmented on the grouping column. In the case where the desired values are the minimum (or maximum) salaries for each department, the table is segmented on the "dep't" column. Since the table has already been sorted on the "dep't" column, the segmentation can be performed by SegSpool. As in the case of a major-minor sort, it is unnecessary to actually copy rows into the spool, since the only information that is necessary is the identity of the first row in a segment.

At step 1256, the first row in each segment is identified, and the minimum (or maximum) value is identified from the relevant column in the identified row. For example, if the information sought is the minimum salary for each department, the table is segmented on the "dep't" column, and the salary value is read from the first row in each segment.

Reordering Expressions with GbApply

Some queries may have expression trees that can be rewritten using the GbApply operator. However, when the technique described above is used to produce a tree with the GbApply operator, the new tree still may specify an inefficient way to evaluate the query. For example, consider a query to locate all employees who make more than the average salary of their department, but only for those departments that have the word 'marketing' in their name. Such a query may have the form:

```
Select E1.empname from employees E1, departments D
where E1.dept = D.dept
and D.name like '%marketing%'
and E1.salary > ( select avg(E2.salary)
   from employees E2
   where E2.dept = E1.dept)
```

In this query, the "employees" and "departments" tables are in the form of tables 200a and 200b, respectively (shown in FIG. 3).

Figure 13:
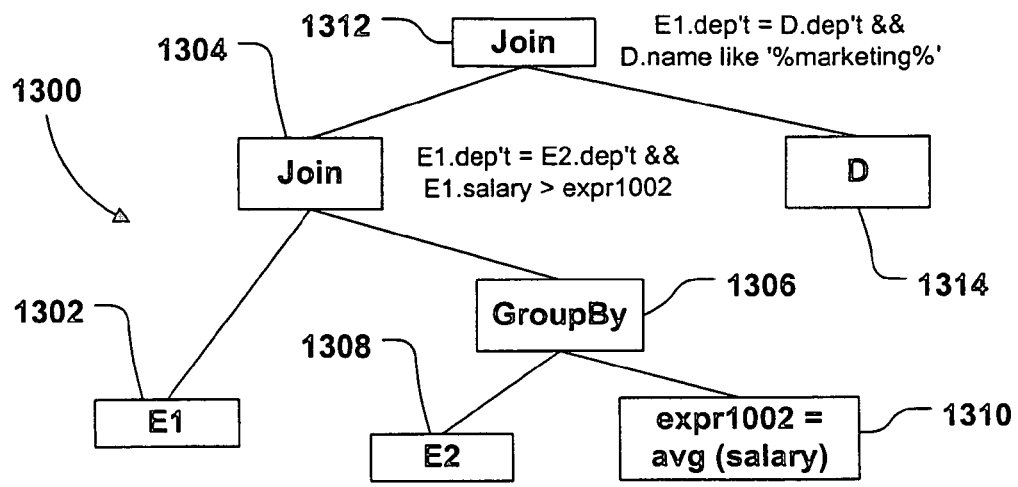
FIG. 13 is a block diagram of a fifth exemplary expression tree.

FIG. 13 shows an expression tree 1300 corresponding to the above query. According to the above-described technique of identifying expressions or sub-expressions in the form of FIG. 7, the portion of the tree represented by nodes 1302-1310 may be targeted for rewriting using the GbApply operator. That is, the join at node 1304 may be applied on a per-segment basis. Thus, in evaluating the expression the employees table will be segmented into groups having the same department, and rows that satisfy the salary criteria will be identified. Then, rows that do not have "marketing" in the department name will be eliminated by joining the GbApply result with department table D (blocks 1312 and 1314). This may not be the most efficient way to evaluate the query if there are very few departments meeting the 'name like % marketing %' condition. Greater efficiency could be achieved if E1 could be reduced by joining it with Departments D and then using the GbApply strategy on the people who are left. It should be noted that such reordering of evaluation does not change the result because the join predicate with the Departments table is such that for any department, either all the employees of that department are in the join result or none of them are. If the join predicate were such that only some of the employees of a department were in the result, some of the segments would be incomplete in the reordered tree, and the average for those segments (expr1002 in FIG. 13) would be incorrect.

Figure 14A:
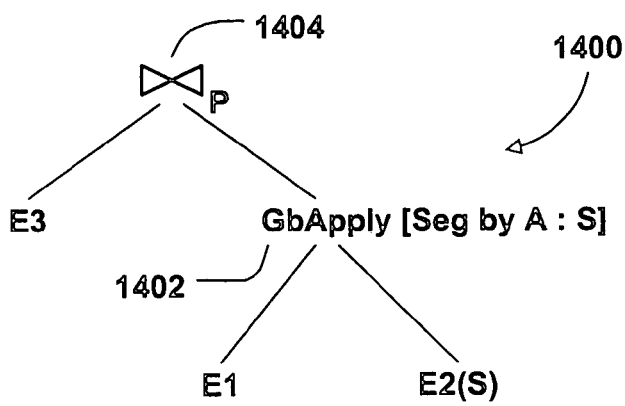
FIG. 14A is a block diagram of a generalized form of an expression tree that may be reordered in accordance with aspects of the invention.

FIG. 14A shows the generalized form of an expression tree 1400 that may be reordered in accordance with the invention. Expression tree 1400 includes a GbApply operator 1402. Relation E1 is the input to GbApply operator 1402. Relation E1 is segmented by columns A, and relational fragment E2(S) is applied to relation E1 on a per-segment basis. For example, E1 may correspond to node 904 (shown in FIG. 9), and E2(S) may correspond to nodes 906-914 (also shown in FIG. 9). Expression tree 1400 also includes a join 1404 having a predicate P. The result of GbApply operator 1402 is the right operand of join 1404, and a relation E3 is the left operand of join 1404.

Figure 14B:
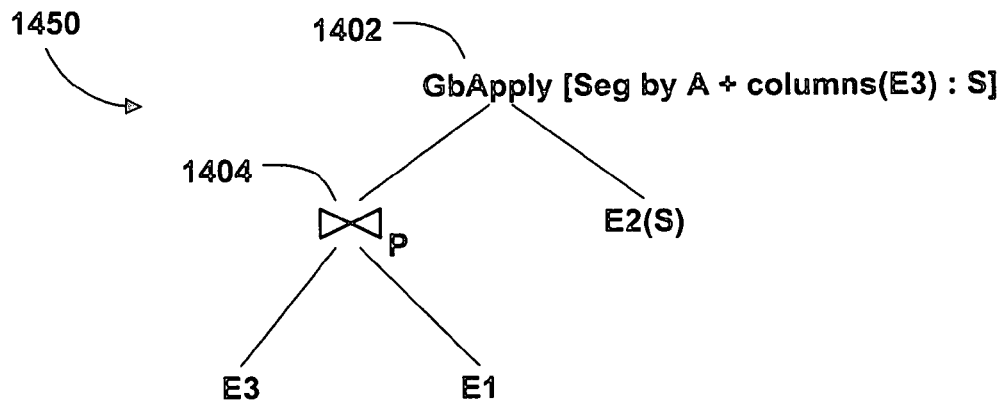
FIG. 14B is a block diagram of the expression tree of FIG. 14A which has been reordered in accordance with aspects of the invention.

Expression tree 1400 may be rewritten as expression tree 1450, shown in FIG. 14B. In expression tree 1450, join 1404 continues to use relation E3 as its left operand, but now uses relation E1 as its right operand. GbApply operator 1402 continues to use relational fragment E2(S) as the per-segment operation to be performed on its input table, but the input table to GbApply operator 1402 is now the result of join 1404 rather than relation E1. Moreover, in rewritten expression tree 1450, the segmenting columns for GbApply operator 1402 have been augmented to include the columns of E3. (although due to column equivalences the addition of the columns of E3 may not actually result in adding new columns to the original set of segmenting columns. The columns of E3 are added to the set of segmenting columns because pushing the join and keeping the same segmentation columns generally modifies the number of rows, but adding the columns of E3 to the set of segmenting columns prevents this. For example, if the original GbApply expression involves a "count" aggregate and the join is pushed below the GbApply without changing the segmenting columns, then each segment in the reordered expression may include a greater number of rows than in the original expression, so a reordered expression involving a "count" aggregate would not be equivalent to the original expression.

It should be noted that the number of rows can be made correct simply by adding a key of E3 to the set of segmenting columns. However, in a preferred embodiment of the invention, GbApply adds the values of the segmenting columns to the results of the expression E2(S). It should be noted, with reference to FIGS. 14A and 14B that the result of join 1404 in the original expression is a relation having all of the columns of E3 plus all of the columns of E1. Since GbApply adds the segmenting columns to the result of E2(S), adding all of the columns in E3 to the set of segmenting columns will cause the top level GbApply operator 1402 in the reordered expression to produce a relation having all of the columns of E3 plus all of the columns of E1. It should also be understood that a grouping on a set of columns (say, A, B, C, D, and E) can be performed by grouping only on a key of those columns. (E.g., if A is a key for A, B, C, D, and E, then grouping on A is equivalent to grouping on A, B, C, D, and E.) Thus, the reordered GbApply expression may by optimized by performing the segmentation only on the original segmenting columns A plus key(E3), although in the case where the GbApply operator is designed to add all of the segmenting columns to the result of E2(S), it may be convenient to specify in the reordered expression tree that all of the columns of E3 are to be added to the original set of segmenting columns.

Expression tree 1400 may be reordered at expression tree 1450 without affecting the result, provided that expression tree 1400 meets certain conditions. Preferably, the condition comprises the criterion that the set of columns in the predicate that come from the GbApply side is a subset of the set of segmenting columns. With reference to FIGS. 14A and 14B, this condition means that predicate P references only columns that are in either E3 or A. It should be observed that the predicate P can always be made to satisfy this condition by separating it into conjuncts and moving up the pieces that do not satisfy this condition above the join as a separate select.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method that is computer implemented of evaluating a semijoin having a first operand, a second operand, and a predicate, said method comprising the acts of:
   determining that said first and second operands each comprise first and second instances, respectively, of a common relation;
   determining that said predicate is, or conjunctively includes, an equality comparison between one or more columns of said first instance of said relation and corresponding columns of said second instance of said relation;
   segmenting said common relation based on said one or more columns to produce one or more segments of said common relation;
   performing said semijoin separately on each of said segments;
   processing a query in accordance with said semijoin, wherein said processing comprises transforming, by a computer processor, data in a memory according to the query to generate a query result; and
   sending the query result to an issuer of the query.

2. The method of claim 1, further comprising the act of spooling each of said segments in a memory location, wherein said performing act comprises applying said semijoin successively to the segments spooled in said memory location.

3. The method of claim 1, further comprising the act of compiling a SQL query which includes an EXISTS clause to produce a relational expression that includes said semijoin.

4. A method that is computer implemented of evaluating an anti-semijoin having a first operand, a second operand, and a predicate, said method comprising the acts of:
   determining that said first and second operands each comprise first and second instances, respectively, of a common relation;
   determining that said predicate is, or conjunctively includes, an equality comparison between one or more columns of said first instance of said relation and corresponding columns of said second instance of said relation;
   segmenting said common relation based on said one or more columns to produce one or more segments of said common relation;
   performing said anti-semijoin separately on each of said segments;
   processing a query in accordance with said anti-semijoin, wherein said processing comprises transforming, by a computer processor, data in a memory according to the query to generate a query result; and
   sending the query result to an issuer of the query.

5. The method of claim 4, further comprising the act of spooling each of said segments in a memory location, wherein said performing act comprises applying said anti-semijoin successively to the segments spooled in said memory location.

6. The method of claim 4, further comprising the act of compiling a SQL query which includes a NOT EXISTS clause to produce a relational expression that includes said anti-semijoin.

7. A method that is computer implemented of sorting rows of a database table according to a first set of one or more columns, said rows having been sorted on a second set of one or more columns, said method comprising the acts of:
   segmenting said database table based on said second set of columns to produce segments of said database table, each of said segments comprising rows having common values in said second set of columns;
   separately sorting each of said segments based on the values in said first set of columns, wherein said segmenting act is performed without spooling rows of said segments;
   processing a query in accordance with the sorted segments, wherein said processing comprises transforming, by a computer processor, data in a memory according to the query to generate a query result; and
   sending the query result to an issuer of the query.

8. The method of claim 7, wherein said segmenting act comprises:
   identifying a first row of said database table, said first rows having first values in said second set of columns; and
   identifying a second row of said database table, said second row having said first values in said second set of columns, said database table having an order, said second row being the last occurring row in said order having said first values in said second set of columns.

9. The method of claim 7, wherein said act of separately sorting comprises:
   invoking a first function which sorts rows in first one of said segments;
   invoking a second function which identifies a next one of said segments; and
   repeating said acts of invoking said first and second function until all of said segments have been exhausted.

10. The method of claim 7, further comprising the act of:
    creating an expression tree including a GbApply operator having:
       a first child sub-tree specifying said database table as input to said GbApply operator;
       segmentation data indicating that said database table is to be segmented on said second set of columns; and
       a second child sub-tree specifying a relational fragment to be performed on each of said segments, said relational fragment specifying a sort of the rows of said segments on said first set of columns.

11. In a database system that is computer implemented which performs operations on a table having rows and columns, a method of identifying a row having a superlative value in a first of said columns from among a set of rows having a common value in a second of said columns, said method comprising the acts of:
    segmenting said rows based on the values in said second column to produce groups of one or more rows, wherein all of the rows in a first of said groups have a common value in said second column;

sorting the rows in said first group based on the values in said first column;

identifying the first or last row in said first group;

processing a query in accordance with the identified row, wherein said processing comprises transforming, by a computer processor, data in a memory according to the query to generate a query result; and sending the query result to an issuer of the query.

12. The method of claim 1, wherein said superlative value comprises a maximum value, and wherein said identifying act comprises identifying the last row in said first group.

13. The method of claim 11, wherein said superlative value comprises a minimum value, and wherein said identifying act comprises identifying the first row in said first group.

14. The method of claim 11, wherein said segmenting act comprises:

sorting said rows based on the values in said second column; and following said sorting act, identifying the first and last rows which have said common value in said second column.

15. The method of claim 11, further comprising the act of:

creating an expression tree including a GbApply operator having:
- a first child sub-tree specifying said table as input to said GbApply operator;
- segmentation data indicating that said database table is to be segmented on said second set of columns; and
- a second child sub-tree specifying a relational fragment to be performed on each of said segments, said relational fragment specifying the selection of either the first or last of the rows in a segment.

16. A computer-readable storage medium having computer executable instructions for performing the following acts:

determining that a relational expression includes a join operator having:
- a first operand which includes a first instance of a relation based on information stored in a database, said relation having a set of rows and a set of columns;
- a second operand including a second instance of said relation; and
- a join predicate which is, or conjunctively includes, an equality comparison between one or more columns of said first instance of said relation and corresponding one or more columns of said second instance of said relation;

segmenting said relation based on said one or more columns to produce one or more segments of said relation;

applying said join operator separately to each of said segments;

processing a query in accordance with said join operator and said segments, wherein said processing comprises transforming, by a computer processor, data in a memory according to the query to generate a query result; and sending the query result to an issuer of the query.

17. The computer-readable storage medium of claim 16, having further computer executable instructions for performing the act of identifying said relational expression as a fragment of a larger expression.

18. The computer-readable storage medium of claim 16, having further computer executable instructions for performing the acts of:

creating a first expression tree representative of said relational expression; and creating a second expression tree based on said first expression tree, said second expression tree including a node having:

data indicative of said relation;

data indicative of said one or more columns; and data indicative of said join operator.

19. The computer-readable storage medium of claim 18, having further computer executable instructions for performing the act of determining that second expression can be evaluated more efficiently than said first expression tree.

20. The computer-readable storage medium of claim 16, wherein said join operator comprises one of: inner join, semi-join, or anti-semijoin.

21. The computer-readable storage medium of claim 16, having further computer executable instructions for performing the act of determining that said first operand further includes a filter which modifies said first instance of said relation according to a second predicate.

22. The computer-readable storage medium of claim 16, having further computer executable instructions for performing the act of determining that said first operand further includes an aggregate operation which specifies the computation of a value based on one or more rows of said relation.

23. The computer-readable storage medium of claim 16, having further computer executable instructions for performing the act of successively spooling each of said segments, wherein said applying act comprises applying said join operator to the segment in said spool.

24. The computer-readable storage medium of claim 16, wherein said relation comprises a stored table.

25. The computer-readable storage medium of claim 16, wherein said relation comprises a sub-expression based on one or more stored tables, and wherein said computer-readable medium further comprises the act of evaluating said sub-expression to produce said relation.

26. The computer-readable storage medium of claim 16, having further computer executable instructions for performing the act of compiling a query to produce said relational expression.

27. The computer-readable storage medium of claim 16, wherein said segmenting act comprises:

sorting said relation;

spooling a first row of the sorted relation; and spooling successive rows of the sorted relation until a row is encountered having values in said one or more columns that differ from the values in said one or more columns of said first row.

28. A computer-readable storage medium having computer executable instructions for performing the following acts:

determining that a relational expression includes:

a first join operator having:
- a first operand which includes a first instance of a first relation based on information stored in a database, said first relation having a set of rows and a set of columns;
- a second operand including a second instance of said first relation; and
- a first predicate which is, or conjunctively includes, an equality comparison between one or more columns of said first instance of said first relation and corresponding one or more columns of said second instance of said first relation; and a second join operator having:
- a third operand which includes the result of said first join operator;
- a fourth operand including a second relation based on information stored in said database; and
- a second predicate;

performing a join of said second relation and said first relation using said second predicate to produce an intermediate result;

segmenting said intermediate result based on said one or more columns to produce one or more segments of said intermediate result;

applying said first join operator including said first predicate separately to each of said segments;

processing a query in accordance with said first join operator, said first predicate and said segments, wherein said processing comprises transforming, by a computer processor, data in a memory according to the query to generate a query result; and sending the query result to an issuer of the query.

29. The computer-readable storage medium of claim 28, wherein said segmenting act is further based on a key of said second relation.

30. The computer-readable storage medium of claim 28, wherein said segmenting act is further based on all columns of said second relation.

31. The computer-readable storage medium of claim 28, having further computer executable instructions for performing the act of:
determining that said second predicate references only columns in the set of columns consisting of:
said one or more columns; and
columns in said second relation.

32. The computer-readable storage medium of claim 28, having further computer executable instructions for performing the acts of:
removing conjuncts from said second predicate that reference columns other than:
said one or more columns; and
columns in said second relation; and
removing rows from the result of said applying step that do not satisfy the removed conjuncts.

33. The computer-readable storage medium of claim 28, having further computer executable instructions for performing the act of comparing the predicted efficiency of at least two procedures of evaluating said relational expression.

34. The computer-readable storage medium of claim 28, having further computer executable instructions for performing the act of identifying said relational expression as a fragment of a larger expression.

35. The computer-readable storage medium of claim 28, wherein either said first join operator or said second join operator comprises one of: inner join, semijoin, or anti-semijoin.

36. The computer-readable storage medium of claim 28, having further computer executable instructions for performing the act of determining that said first operand further includes a filter which modifies said first instance of said first relation according to a third predicate.

37. The computer-readable storage medium of claim 28, having further computer executable instructions for performing the act of determining that said first operand further includes an aggregate operation which specifies the computation of a value based on one or more rows of said first relation.

38. The computer-readable storage medium of claim 28, having further computer executable instructions for performing the act of successively spooling each of said segments, wherein said applying act comprises applying said first join operator to the segment in said spool.

39. The computer-readable storage medium of claim 28, wherein said first relation comprises a stored table.

40. The computer-readable storage medium of claim 28, wherein said first relation comprises a sub-expression based on one or more stored tables, and wherein said computer-readable medium further comprises the act of evaluating said sub-expression to produce said first relation.

41. The computer-readable storage medium of claim 28, wherein said segmenting act comprises:
sorting said intermediate result;
spooling a first row of the sorted intermediate result; and
spooling successive rows of the sorted intermediate until a row is encountered having values in said one or more columns that differ from the values in said one or more columns of said first row.

42. A computer-readable storage medium of providing information from a database comprising the acts of:
determining that a first relational expression includes a join operator having:
a first operand which includes a first relation based on information stored in said database;
a second operand which includes an operator calling for a relational fragment to be applied successively to segments of said second relation, said second relation being based on information stored in said database, said segments of said second relation being based on distinct values of one or more columns of said second relation; and
a predicate;
creating a second relational expression that includes:
an operator calling for said relational fragment to be applied successively to segments of a third relation, said segments of said third relation being based on distinct values of said one or more columns and all columns of said first relation, said third relation being the result of a join operator having:
a third operand which includes said first relation;
a fourth operand which includes said second relation; and
said predicate;
evaluating said second relational expression;
processing a query in accordance with the evaluated second relational expression, wherein said processing comprises transforming, by a computer processor, data in a memory according to the query to generate a query result; and
sending the query result to an issuer of the query.

43. The computer-readable storage medium of claim 42, having further computer executable instructions for performing the act of determining that said predicate references only columns in the set of columns consisting of:
said one or more columns; and
columns in said first relation.

44. The computer-readable storage medium of claim 42, having further computer executable instructions for performing the acts of:
removing conjuncts from said predicate that reference columns other than:
said one or more columns; and
columns in said first relation; and
removing rows from the result of said evaluating step that do not satisfy the removed conjuncts.

45. The computer-readable storage medium of claim 42, wherein said join operator comprises one of: inner join, semijoin, or anti-semijoin.

* * * * *